United States Patent Office 2,832,806
Patented Apr. 29, 1958

2,832,806

VINYLPENTACHLOROPHENYL SULFIDE AND METHOD OF MAKING THE SAME

Earl D. Holly and Stanley H. Vasicek, Midland, Mich., assignors to The Dow Chemical Company, Midland, Mich., a corporation of Delaware No Drawing. Application January 3, 1957
Serial No. 632,266

8 Claims. (Cl. 260—609)

This invention concerns vinylpentachlorophenyl sulfide, a new chemical compound having the formula $C_6Cl_5 \cdot S \cdot CH = CH_2$, and relates to a method of making the same.

It is known to prepare vinylthioaryl ethers by reacting acetylene with a thioaryl compound such as thiophenol, thiocresol or 2,5-dimethyl-4-chlorothiophenol in the presence of a basic catalyst, e. g. potassium hydroxide (see German Patent No. 616,543). However, the method is not satisfactory for the preparation of vinylpentachlorophenyl sulfide. Attempts to prepare vinylpentachlorophenyl sulfide by reaction of acetylene with pentachlorothiophenol in the presence of potassium hydroxide have shown that the reaction rapidly reaches equilibrium conditions at low conversion with corresponding low yields of the desired product or does not proceed to any observable extent.

It has now been discovered that vinylpentachlorophenyl sulfide can readily be obtained in good yield by reacting acetylene with an alkali metal salt of pentachlorothiophenol in admixture with an alkali metal bicarbonate or a mono- or di-hydric alkali metal phosphate and water at elevated temperatures and pressures as hereinafter described.

The alkali metal bicarbonates or mono- and di-alkali metal phosphates to be employed in the process can be the potassium or sodium salts, preferably the latter, such as sodium bicarbonate, potassium bicarbonate, monobasic potassium phosphate, dibasic potassium phosphate, monobasic sodium phosphate or dibasic sodium phosphate. Mixtures of the salts can also be used.

It is important that the alkali metal bicarbonate or mono- or di-alkali metal phosphate be present in the reaction mixture in an amount that is at least chemically equivalent to the alkali metal salt of the pentachlorothiophenol starting material in order to obtain good yields of the vinylpentachlorophenyl sulfide product.

The reactions which occur employing water as the reaction medium can be illustrated by the equations:

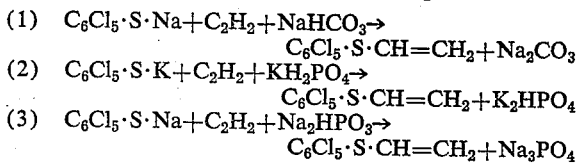

(1) $C_6Cl_5 \cdot S \cdot Na + C_2H_2 + NaHCO_3 \rightarrow$
$\quad C_6Cl_5 \cdot S \cdot CH = CH_2 + Na_2CO_3$
(2) $C_6Cl_5 \cdot S \cdot K + C_2H_2 + KH_2PO_4 \rightarrow$
$\quad C_6Cl_5 \cdot S \cdot CH = CH_2 + K_2HPO_4$
(3) $C_6Cl_5 \cdot S \cdot Na + C_2H_2 + Na_2HPO_3 \rightarrow$
$\quad C_6Cl_5 \cdot S \cdot CH = CH_2 + Na_3PO_4$ The reaction tends to be incomplete when the alkali metal bicarbonate or the mono- or di-alkali metal phosphate is employed in amount less than a stoichiometric proportion, although greater amounts of said salts can be used.

The alkali metal bicarbonate can be formed in situ, e. g. by adding an alkali metal carbonate such as sodium carbonate or potassium carbonate to the pentachlorothiophenol starting material in admixture with water whereby the corresponding pentachlorophenyl mercaptide is obtained together with alkali metal bicarbonate. The mono- or di-alkali metal phosphates can be formed in situ in similar manner by mixing tri-alkali metal phosphate or di-alkali metal phosphate with the pentachlorothiophenol and water.

Conversely, the pentachlorophenyl alkali metal mercaptide can be prepared by reacting pentachlorothiophenol with an alkali metal hydroxide.

The reaction is carried out in an aqueous medium, suitably water in amount sufficient to provide a solution or slurry which can readily be stirred, preferably a solution of the pentachlorophenyl mercaptide having a pH value within the range of that corresponding to a solution of water and an alkali metal bicarbonate or a mono- or di-alkali metal phosphate, e. g. a pH value between 8 and 12.

The reaction can be carried out at temperatures between 190° and 240° C., preferably from 190° to 220° C., and at superatmospheric pressures, e. g. at from 100 to 300 pounds per square inch, gauge, or above.

In practice, the pentachlorothiophenol or an alkali metal salt thereof is placed in a pressure-resistant vessel together with water. An alkali metal carbonate or phosphate is added in amount sufficient to form the corresponding alkali metal pentachlorophenyl mercaptide, together with alkali metal bicarbonate or mono- or di-alkali metal phosphate when the starting material is pentachlorothiophenol, or when the starting material is the alkali metal pentachlorophenyl mercaptide an alkali metal bicarbonate or a mono- or di-alkali metal phosphate is added in amount at least chemically equivalent to the mercaptide. Thereafter, acetylene is added under pressure, suitably a pressure of from 50 to 200 pounds per square inch, gauge, or more. The mixture is agitated and heated at reaction temperatures between 190° and 240° C. until the reaction is complete or substantially complete. The course of the reaction can be followed by observing the drop in pressure within the reaction vessel as the acetylene is consumed in the reaction. Acetylene can be added as the reaction proceeds or the reaction can be carried out under a predetermined pressure of the reactants. Upon completing the reaction, the pressure is released and the reacted mixture removed. The product can be recovered in usual ways, e. g. by distillation or crystallization from a solvent.

The compound vinylpentachlorophenyl sulfide can be polymerized alone to form a non-flammable polymeric product. It can be copolymerized with vinyl or vinylidene compounds such as vinyl aromatic hydrocarbons, vinyl ethers, vinyl esters, acrylonitrile, etc. to form flame resistant polymeric products which are useful for a variety of purposes. It is useful as an intermediate in the preparation of other chemical compounds.

The following examples illustrate ways in which the principle of the invention has been applied, but are not to be construed as limiting its scope.

*Example 1*

A charge of 141 grams (0.5 mole) of pentachlorothiophenol, 53 grams (0.5 mole) of sodium carbonate and 350 ml. of water was placed in a stainless steel autoclave packed with ⅜ inch stainless steel rings. The autoclave was purged with acetylene, then sealed and acetylene added through a valved inlet until the pressure in the autoclave was 100 p. s. i., gauge. The mixture was agitated and heated at a temperature of 190° C. under pressure of the acetylene at from 190 to 200 p. s. i. over a period of 22 hours. The autoclave was allowed to cool. The pressure was released and the autoclave was opened. The aqueous liquid was removed and discarded. The product was in the form of a solid cake. It was dissolved in toluene at a temperature of 90° C. and the solution filtered. The filtered solution was distilled. After removing the toluene there was obtained 57.5 grams of vinylpentachlorophenyl sulfide boiling at 111°–143° C. at from 0.05 to 0.12 millimeter absolute pressure, which material crystallized upon cooling. It was recrystallized from a mixture of equal parts by volume of benzene and methyl alcohol. The product was a white crystalline material melting at 74.6°–75.3° C. It was analyzed and found to contain 57.58 percent by weight of chlorine and 10.32 percent of sulfur. The product is a new compound having the empirical formula $C_6Cl_5 \cdot S \cdot CH = CH_2$.

*Example 2*

A charge of 80 grams (0.28 mole) of pentachlorothiophenol was added to a solution of 400 ml. of water and 18.5 grams (0.30 mole) of potassium hydroxide. The mixture was stirred. The pentachlorothiophenol was converted to the corresponding potassium salt which dissolved in the water. A charge of 30.3 grams (0.29 mole) of sodium carbonate and 24 grams (0.29 mole) of sodium bicarbonate was added. The resulting mixture was placed in a stainless steel autoclave and heated in contact with acetylene under 200 p. s. i. gauge pressure at a temperature of 188° C. for a period of 4 hours. Thereafter, the autoclave was cooled, the pressure released and the contents removed. Sixty-nine percent of the pentachlorothiophenol was converted to vinylpentachlorophenyl sulfide.

*Example 3*

A charge of 141 grams (0.5 mole) of pentachlorothiophenol, 350 ml. of water and 69 grams (0.50 mole) of potassium carbonate, was placed in a stainless steel autoclave. The mixture was agitated and heated in contact with acetylene under 200 p. s. i. gauge pressure at a temperature of 188° C. for a period of 21 hours, then was cooled and the pressure released. The reacted material was removed from the autoclave. Twenty-five percent of the pentachlorothiophenol was converted to vinylpentachlorophenyl sulfide.

*Example 4*

A charge of 423 grams (1.5 moles) of pentachlorothiophenol, 1050 ml. of water and 159 grams (1.5 moles) of sodium carbonate was placed in a stainless steel autoclave and agitated and heated in contact with acetylene under a pressure of 200 p. s. i. gauge pressure at a temperature of 190° C. for a period of 6 hours, then cooled and the pressure released. The reaction product was recovered employing procedure similar to that employed in Example 1. The yield of vinylpentachlorophenyl sulfide was 42 percent based on the pentachlorothiophenol initially used.

*Example 5*

A charge of 28.4 grams (0.1 mole) of pentachlorothiophenol, 100 ml. of water and 10.6 grams (0.1 mole) of sodium carbonate was placed in a one liter stainless steel bomb packed with ⅜ inch stainless steel rings. The bomb was filled with gaseous acetylene under 100 pounds per square inch gauge pressure, then was sealed and heated at a temperature of 240° C. with shaking for a period of 2 hours. Thereafter, the bomb and its contents were cooled, the pressure released and the product removed employing procedure similar to that employed in Example 1. There was obtained 26.7 grams of toluene soluble product containing 5.1 grams of vinylpentachlorophenyl sulfide as determined by infra-red analysis.

*Example 6*

A charge of 141 grams (0.5 mole) of pentachlorothiophenol, 274 ml. of water and 20 grams (0.5 mole) of sodium hydroxide was placed in a one liter stainless steel bomb filled with ⅜ inch diameter stainless steel rings. A charge of 267 grams (1 mole) of sodium hydrogen phosphate of the formula $Na_2HPO_4 \cdot 7H_2O$ was added. The bomb was filled with gaseous acetylene, then was agitated and heated at temperatures between 188° and 190° C. while maintaining the bomb filled with gaseous acetylene under 200 pounds per square inch gauge pressure over a period of 7 hours. Thereafter, the bomb and its contents were cooled, the pressure released and the product removed employing procedure similar to that employed in Example 1. There was obtained 148 grams of toluene soluble product consisting of 77 percent by weight of vinylpentachlorophenyl sulfide as determined by infra-red analysis. This corresponds to a yield of 73 percent of the vinylpentachlorophenyl sulfide, based on the pentachlorothiophenol initially used.

*Example 7*

A charge of 5 grams of the vinylpentachlorophenyl sulfide obtained in Example 1 and 0.005 gram of azobis 2,2'-isobutyronitrile as catalyst was sealed in a glass ampoule and heated at a temperature of 80° C. for a period of 36 hours. Thereafter, the ampoule was cooled, broken and the contents dissolved in benzene. The benzene solution was poured into methyl alcohol with stirring to precipitate the polymer. The polymer was separated by filtering and was dried. There was obtained 2.5 grams of polymer as a white powder. The polymer melted at temperatures between 160° and 165° C. It did not ignite when held in an open flame. The polymer is thermoplastic and can be molded to form a transparent sheet.

We claim:

1. A method of making vinylpentachlorophenyl sulfide which comprises heating an alkali metal pentachlorophenyl mercaptide in admixture with water and at least one alkali metal salt selected from the group consisting of the alkali metal bicarbonates and the mono- and di-alkali metal phosphates, with acetylene at reaction temperatures between 190° and 240° C. under pressure.

2. A method of making vinylpentachlorophenyl sulfide which comprises heating an alkali metal pentachlorophenyl mercaptide in admixture with an aqueous solution of at least one alkali metal salt selected from the group consisting of the alkali metal bicarbonates and the mono- and di-alkali metal phosphates, in amount at least chemically equivalent to the pentachlorophenyl mercaptide starting material, and acetylene under pressure at reaction temperatures between 190° and 240° C.

3. A method as claimed in claim 2, wherein the alkali metal salt is an alkali metal bicarbonate.

4. A method as claimed in claim 3, wherein the alkali metal salt is potassium bicarbonate.

5. A method of making vinylpentachlorophenyl sulfide which comprises heating pentachlorophenyl sodium mercaptide in admixture with an aqueous solution of sodium bicarbonate and acetylene under pressure at reaction temperatures between 190° and 240° C.

6. A method of making vinylpentachlorophenyl sulfide which comprises heating pentachlorophenyl sodium mercaptide in admixture with an aqueous solution of potassium bicarbonate and acetylene under pressure at reaction temperatures between 190° and 240° C.

7. A method of making vinylpentachlorophenyl sulfide which comprises heating pentachlorophenyl sodium mercaptide in admixture with an aqueous solution of disodium hydrogen phosphate and acetylene under pressure at reaction temperatures between 190° and 240° C.

8. Vinylpentachlorophenyl sulfide having the formula $C_6Cl_5 \cdot S \cdot CH = CH_2$.

No references cited.